United States Patent [19]

Roche

[11] Patent Number: 4,487,434

[45] Date of Patent: Dec. 11, 1984

[54] UNION-TYPE COUPLING FOR MARINE DRILLING RISER PIPE

[75] Inventor: Joseph R. Roche, Houston, Tex.

[73] Assignee: Hydril Company, Los Angeles, Calif.

[21] Appl. No.: 352,588

[22] Filed: Feb. 26, 1982

Related U.S. Application Data

[63] Continuation of Ser. No. 105,136, Dec. 19, 1979, abandoned.

[51] Int. Cl.³ .............................................. F16L 35/00
[52] U.S. Cl. ................................ 285/93; 285/137 A; 285/354; 285/DIG. 13
[58] Field of Search ................... 285/137 A, 354, 386, 285/379, 91, 92, 93, 317, 96, 355, 390, 39, 353, 114, DIG. 7, 391, 382.7; 166/351, 360

[56] References Cited

U.S. PATENT DOCUMENTS

| 762,350 | 6/1904 | Rehnstrom | 285/386 |
| 1,776,280 | 9/1930 | Boyd | 285/91 X |
| 2,210,088 | 8/1940 | Longfield | 285/379 X |
| 3,361,453 | 1/1968 | Brown et al. | 285/354 X |
| 3,806,168 | 4/1974 | McGee et al. | 285/137 A |
| 3,827,728 | 8/1974 | Hynes | 285/90 |
| 3,879,070 | 4/1975 | Russ | 285/382.7 X |
| 3,933,202 | 1/1976 | Ahlstone | 166/360 |
| 4,043,575 | 8/1977 | Roth | 285/90 |
| 4,068,865 | 1/1978 | Shanks | 285/90 |
| 4,093,281 | 6/1978 | Jansen | 285/39 |
| 4,097,069 | 6/1978 | Morrill | 285/84 |
| 4,124,230 | 11/1978 | Ahlstone | 285/18 |
| 4,161,332 | 7/1979 | Blose | 285/334 |
| 4,192,533 | 3/1980 | Blose | 285/355 |

FOREIGN PATENT DOCUMENTS

| 1459858 | 10/1966 | France | 285/354 |
| 707988 | 4/1954 | United Kingdom | 285/39 |

*Primary Examiner*—Dave W. Arola
*Attorney, Agent, or Firm*—Dodge & Bush

[57] ABSTRACT

A coupling for underwater upper and lower riser pipe sections and associated parallel choke and kill line pipe sections, where one riser pipe section is inserted in a second one. One of the riser pipe sections includes a threaded male end which has at least two sets of continuous threads. A female union box carried on the other riser section includes at least two sets of continuous threads interengaged with the sets of threads on the male end, the respective sets of threads being axially and radially spaced from each other, the union box engaging the other riser pipe section for preventing the sections from moving axially relaltive to each other. The sections are provided with a fluid tight seal and choke and kill line sections are also penetratingly joined and supported by the raiser pipe sections.

13 Claims, 2 Drawing Figures

UNION-TYPE COUPLING FOR MARINE DRILLING RISER PIPE

This is a continuation of Ser. No. 105,136, filed 12/19/79, and now abandoned.

TECHNICAL FIELD

This invention relates to riser pipes which are used to connect surface drilling vessels with undersea wellheads and, more particularly, to couplings for joining together adjacent sections of such riser pipe.

Because drilling risers are vertically deployed from floating vessels there are special problems associated with couplings for joining together sections of pipe which make up these risers. Non-uniform forces caused by waves, currents and vessel displacement, require undersea couplings to withstand relatively high bending and tensile loads. Because the ratio of a marine riser's length to its diameter is very high, the riser assembly would fail in buckling if it should ever be subjected to compressive loading, therefore, it is required to maintain the riser in tension over its entire length continuously. External buoyancy devices attached to individual riser pipe joints and vessel mounted tensioning apparatus can be used to provide this loading on the riser pipe. The presence of heavy drilling fluid inside the riser pipe is yet another source of load application to the riser assembly. As a result of this complex and sizeable load application, these couplings must be significantly stronger and tougher (consequently more massive) than those of, for example, above-water applications. At the same time, there are underlying reasons for minimizing the mass of the riser coupling. Some of these considerations are: reduced buoyancy material costs, reduced tensioner requirements, less hydrodynamic drag, reduced deck loading during storage.

Further, assembly of these risers is an enormously expensive operation so even a seemingly minor savings in the time required for coupling or "making-up" adjacent sections of pipe will translate directly into significantly lower operating costs.

BACKGROUND ART

U.S. Pat. No. 4,161,332, owned by the same company which owns the subject invention, is directed to a cylinderical stepped-thread configuration for pin and box joints for oil well tubing, a configuration which virtually eliminates the possibility of cross threading during make-up of pipe sections and results in shorter assembly time. This thread arrangement includes first and second pairs of interengaged sets of threads, one pair of threads being axially and radially spaced from the second pair.

U.S. Pat. Nos. 4,043,575 and 4,097,069 are directed to union-type couplings for riser pipes but are not considered optimally acceptable because they both utilize interrupted load carrying surfaces which cause an uneven load distribution around the circumference of the coupling, requiring a more massive coupling structure. Further, interrupted threads such as the ones in U.S. Pat. No. 4,097,069 are generally more expensive to manufacture than continuous threads because of the greater number of machining operations involved.

U.S. Pat. Nos. 3,827,728 and 4,068,865 are related to dog-type riser couplings which require a relatively long make-up time and massive coupling structure.

U.S. Pat. Nos. 4,093,281 and 4,124,230 utilize hydraulic cylinders to create a pre-tension on the box and pin portions and result in a relatively large coupling mass and structural complexity.

DISCLOSURE OF THE INVENTION

In accordance with the present invention, a coupling is provided for underwater riser pipe sections and associated choke and kill line pipe sections. A pair of riser pipe sections are penetratingly joined, with the uppermost section overlapping the upper end of the lowermost section, the sections being designed to engage each other for limiting inward movement of the inserted section relative to the other section. A female union nut or "box member" is carried on the uppermost section to couple the sections together. The inner surface of the box member and the portion of the lowermost pipe section adjacent to the uppermost section, or "pin member", include first and second pairs of interengaged sets of continuous threads, the first thread set being axially and radially spaced relative to the second set. When the required make-up torque is applied to the box member, the relative axial displacement of the box and pin causes a shoulder on the inner surface of the box to engage an integral shoulder on the outer surface of the upper pipe section or mandrel for holding the sections together. Upper and lower choke and kill line sections are also penetratingly joined and supported through connections with the riser pipe sections.

Although this coupling has a seemingly simple structure, it offers significant advantages over prior art riser section couplings because of the continuous threads and the ease and accuracy by which the stepped-thread configuration allows the sections to be aligned and coupled. The continuous threads provide a uniform stress distribution circumferentially around the coupling which accordingly reduces the size requirements of the coupling structure. The stepped-thread configuration, with one set of threads axially and radially spaced from the other set, allows continuous threads to be used for these large riser pipe sections since stepped-threads of this type provide for deeper insertion of the pin member before the box member is rotated. This essentially eliminates the problems of misalignment and incomplete joint make-up and significantly reduces make-up time. Use of these two-stepped threads is described in greater detail in U.S. Pat. No. 4,161,332, which is totally incorporated by reference herein as though it is fully set forth.

BRIEF DESCRIPTION OF THE DRAWINGS

A better understanding of the details of the invention will be obtained from the detailed description of a preferred embodiment of the invention, set forth below, when considered in connection with the accompanying drawings, in which.

BEST MODE FOR CARRYING OUT THE INVENTION

Figure 1:
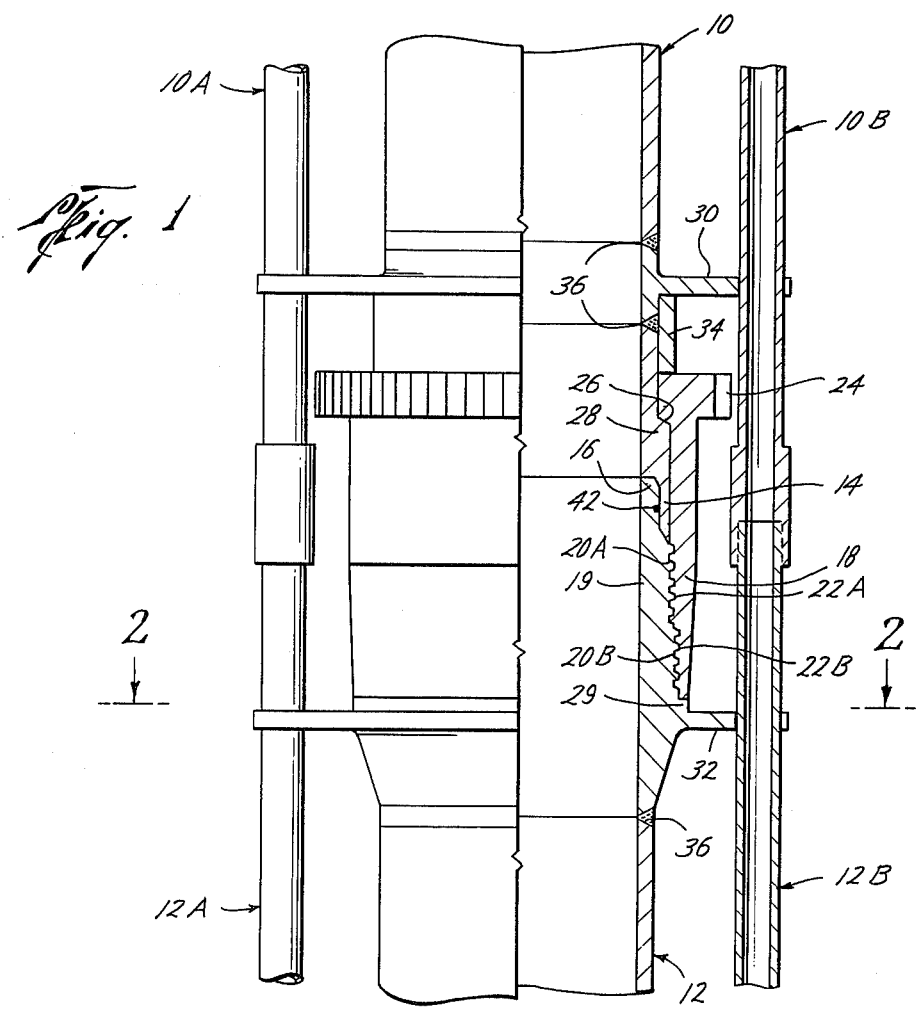
FIG. 1 is a side plan view, partially in section, showing an embodiment of the invention where the upper riser coupling section overlaps the lower riser coupling section.
Figure 2:
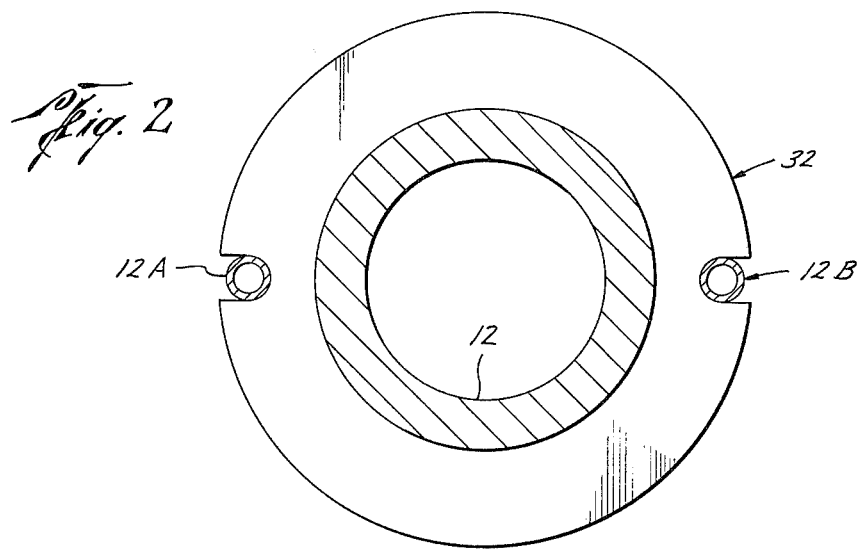
FIG. 2 is a sectional view looking along a section line in the direction of arrows 2—2 as shown in FIG. 1.

Referring to FIGS. 1 and 2, one embodiment of the subject invention is shown where reference numeral 10 refers to an upper riser pipe section and reference numeral 12 to a lower rise pipe section. Choke and kill line sections 10a, 12a and 10b, 12b, are supported by the riser sections 10, 12, respectively, which together form what is known as an integral riser joint.

The riser coupling sections are joined through union-type couplings by holding the lower sections 12, 12a and 12b in a spider (not shown) and lowering the upper sections 10, 10a and 10b until the latter are simultaneously "stabbed" or penetrated by the former. As shown in FIG. 1, the upper riser section 10 has a mandrel portion 14 formed at its lower end, which overlaps a recess 16 formed at the upper end of the riser section 12 to provide the penetration fit between the two sections. The choke and kill sections are joined through a similar type of penetration arrangement which will not be described in detail since it is already known in the prior art.

When the upper riser section 10 is lowered in place, a threaded female union nut or box member 18 which is carried at the lower end of the riser section 10 is lowered and overlaps the upper threaded end or pin member 19 of the riser section 12. The box member 18 and the pin member 19 are both provided with first and second sets of continuous threads, the sets on the pin member 19 being designated by reference numerals 20a and 20b and on the box member 18 by reference numerals 22a and 22b. As shown in FIG. 1, the first sets of threads 20a and 22a are axially and radially spaced from the second sets 20b and 22b. These threads can be similar in design to the ones described and claimed in U.S. Pat. No. 4,161,332 which as mentioned above is incorporated by reference herein. An improved configuration of stepped threads can also be used where small gaps are provided on the outer and lower sides of the dove-tail threads so that the pin and box members will be drawn toward each other when the riser sections are held in tension, that improvement being shown and described in a U.S. patent application Ser. No. 932,278, filed Aug. 9, 1978, and entitled "Threaded Connection", which is also owned by the same company which owns the subject invention and which is also totally incorporated by reference herein as though fully set forth.

The coupling is completed by rotating the box member 18 by applying power tongs (not shown) to a torque ring 24 formed integral with the box member 18 and projecting outwardly from its upper surface. Other alternative means of rotating the box member 18 can suitably be used such as, for example, appropriate chain, gear, or belt drives as known in the prior art. Complete make-up can easily be verified by observing when the lower end of the box member 18 engages a shoulder 29 located on the outer surface of the pin member 19.

When the coupling has make-up torque applied, the box member 18 and the pin member 19 are drawn into a penetration engagement until the inner shoulder 26 on the box and the shoulder on the pin 40b exert a compressive load on the torus 28 on the mandrel 14. Subsequent elastic deformation of the torus 28 results in an axial preload force circumferentially uniformly loading the threads 20a and 20b on the pin 19 and the threads 22a and 22b on the box 18. This load combined with the frictional force between mating thread surfaces keeps the threaded connection mechanically locked. The connection can be loosened by the deliberate application of break-out torque in the rotational direction to disengage the threads applied through the same mechanism described above used for make-up. This torque must be of sufficiently high magnitude to overcome the substantial frictional force in the threads 22a, 22b, 20a, 20b induced by the elastic deformation in the mandrel torus 28.

An advantage of this type of coupling is that alignment of the riser sections is assured and easily achieved by engagement of the mandrel portion 14 with the recess 16. The continuous threads provide a uniform stress distribution around the coupling which lowers the mass requirements for the coupling.

The choke and kill sections are supported by upper and lower support rings 30, 32, respectively, connected to the riser pipe sections. A spacer ring 34 can be located between the torus ring and the box member 18 to enable the individual riser pipe sections to be joined when the box member 18 is at the upper end of each section and the pin member 19 is at the lower end. In this mode the box member need not be lifted to initiate engagement of the male and female threads.

As shown, the support rings and the mandrel 14 and pin member 19 can be welded in place on their respective riser sections as shown by the welds indicated by reference numeral 36. In this embodiment, a primary seal between the riser pipe sections 10, 12, is provided by an O-ring 42.

Thus, a coupling is provided which requires significantly less mass to resist undersea bending and tensile loads than couplings in the prior art, which offers the advantages described above. Further, the coupling can be formed in significantly less time than those in the prior art, resulting in lower operating costs.

It should be understood that those with ordinary skill in the revelent art will be able to make improvements and modifications to the invention and that all such improvements and modifications are contemplated as falling within the scope of the appended claims.

I claim:

1. A coupling adapted for releasably securing first and second riser pipe sections in an aligned operating relationship for forming an internal fluid path comprising:

a box end member connected to the end of the second riser pipe section, said box end member having a torus member formed about the periphery of the end of the box end member, said torus having an upwardly facing shoulder and a downwardly facing shoulder means, a pin end member connected to the end of the first riser pipe section, the upper end of the pin member having an upper end means shaped to engage the downwardly facing shoulder means of the torus member of the box end member, the pin end member having an outer surface adjacent its end having a first set of helical threads formed thereon extending continuously about the periphery of said pin end outer surface, a union box member rotatably mounted coaxially about said box end member, said union box member having a head portion having a downwardly facing shoulder and having a second set of helical threads formed on an inner annular surface of said union box member, said second set of threads of said union box member being continuously interengaged with said first set of threads of said pin end member operably compressing said torus member of the box end member between the downwardly facing shoulder of the head portion of the union box member and the upper end means of the pin member, said upwardly facing shoulder of the torus member operably engaging said downwardly facing shoulder of the head portion of the union box member and said downwardly facing shoulder means of the torus operably engaging the upper end means of the pin member, the interengaging of the first and second threads and the resulting compressing of said torus member operably preloading said coupling and placing said end of the pin end member and said torque member of said box end member in compression while said union box end member is in tension, sealing means for providing a fluid tight seal between the coupled tubular riser pipe sections to prevent leakage therebetween from the flow path of fluid under pressure, the pin end member having an upwardly facing lower annular shoulder disposed beneath said first set of helical threads on the outer surface of said pin end member, the union box member having a lower annular end beneath said second set of helical threads on the inner surface of said union box member, the distance between said lower annular shoulder and said upper end means of the pin member and the distance between the lower annular end of said union box member and the downwardly facing shoulder of said head portion of said union box and the distance between upwardly and downwardly facing shoulders of said torus member being cooperatively provided so that said lower annular end of said union box member engages said lower annular shoulder of said pin end member when said coupling is properly preloaded, the engagement of said lower annular shoulder of said pin end member and said lower annular end of said union box providing a visual indication of proper riser coupling preload.

2. The coupling of claim 1 wherein said downwardly facing shoulder means of said torus of said box end member overlaps the upper end means of said pin member.

3. The coupling of claim 1, and further including an annular gear track formed around the outer surface of the union box for engagement with a drive gear for rotating the union box.

4. The coupling of claim 1 further comprising,
a third set of helical threads formed on said outer surface of said pin end member at an axial location spaced from said first set of helical threads, and
a fourth set of helical threads formed on said inner annular surface of said union box member at an axial location spaced from said second set of helical threads, said third and fourth sets of threads being radially spaced from said first and second sets of threads and being interengaged with other, said first, second, third and fourth sets of interengaged threads forming a two step threaded connected between said pin end member and said union box member.

5. The coupling of claim 1 and further including first and second choke and kill line sections including end portions which are shaped and dimensionsed so that end portions of the first choke and kill line sections can be inserted in end portions of the second choke and kill line sections, and support means connected to the first and second riser pipe sections for respectively supporting the first and second choke and kill line sections.

6. The coupling of claim 5, wherein the support means includes a support ring connected to a riser pipe section on each side of the union box for engaging the choke and kill lines.

7. The coupling of claim 5, and further including a spacer between the union box and the support means on the side of the union box away from the threads.

8. A pin end member adapted for connection to the end of a first riser pipe section and
adapted for use in releasably coupling with a box end member connectable to the end of a second riser pipe section in a substantially longitudinally aligned operating relationship for forming an internal fluid flow path, said box end member having a torus member formed about the periphery of the end of the box end member, said torus having an upwardly facing shoulder and a downwardly facing shoulder means, and a union box member for cooperating with said upwardly facing shoulder means, said union box member rotatably mounted coaxially about said box end member, said union box member having a head portion having a downwardly facing shoulder and having a set of helical threads formed on an inner annular surface of said union box member, said pin end member comprising, an upper end means shaped to engage the downwardly facing shoulder means of the torus member of said box end member, an outer surface adjacent said upper end means having another set of helical threads formed thereon extending continuously about the periphery of said pin end outer surface, said set of threads of said pin end member being continuously interengageable with said set of threads of said union box member and upon such interengagement, said torus member of said box end member is operably compressed between the downwardly facing shoulder of the head portion of the union box member and the upper end means of the pin member, said upwardly facing shoulder of the torus member operably engaging said downwardly facing shoulder of the head portion of the union box member and said downwardly facing shoulder means of the torus member operably engaging the upper end means of the pin member, the interengaging of the sets of threads of the pin end member and the union box member and the resulting compressing of said torus member operably preloading said coupling and placing said end of the pin end member and said torus member of said box end member in compression while said union box member is placed in tension, the pin end member having an upwardly facing lower annular shoulder disposed beneath said first set of helical threads on the outer surface of said pin end member and adapted to cooperate with a lower annular end beneath the set of helical threads on the union box member, the distance between said lower annular shoulder and said upper end means of the pin member and the distance between the lower annular end of said union box member and the downwardly facing shoulder of said head portion of said union box and the distance between upwardly and downwardly facing shoulders of said torus member being cooperatively provided so that said lower annular end of said union box member engages said lower annular shoulder of said pin end member when said pin end member and said box end member are coupled with proper preloading, the engagement of said lower annular shoulder of said pin end member and said lower annular end of said union box providing a visual indication of proper riser coupling preload.

9. The pin end member of claim 8 wherein the shape of the upper end means is adapted to fit within the box end member, the box end member having an annular portion for overlapping the received portion of the upper end member.

10. The pin end member of claim 8 further comprising
a second set of helical continuous threads formed on said outer surface of said pin end member adjacent said upper end means and axially and radially spaced from said other set of helical threads formed thereon and adapted to interengage with a second set of helical continuous threads formed on the inner surface of the union box member.

11. A connector adapted for connection to the end of a second riser pipe section and
adapted for use in releasably coupling with a pin end member connectable to the end of a first riser pipe section in a substantially longitudinally aligned operating relationship for forming an internal fluid flow path,
said pin end member having
an upper end having an upper end means,
an outer surface adjacent said upper end means having a set of helical threads formed thereon extending continuous about the periphery of said pin end outer surface,
said connector comprising,
a box end member connectable to said second riser pipe section, said box end member having a torus member formed about the periphery of the end of the box end member, said torus having an upwardly facing shoulder and a downwardly facing shoulder means, and
a union box member rotatably mounted coaxially about said box end member, said union box member having a head portion having a downwardly facing shoulder and having a set of helical threads formed on an inner annular surface of said union box member,
said set of threads of said union box member being continuously interengageable with said set of threads of said pin end member, and with such interengagement, said torus member of said box end member is operably compressed between the downwardly facing shoulder of the head portion of the union box member and the upper end means of the pin member, said upwardly facing shoulder of the torus member operably engaging said downwardly facing shoulder of the head portion of the union box member and said downwardly facing shoulder means of the torus member operably engaging the upper end means of the pin member, the interengaging of the sets of threads of the pin end member and the union box member and the resulting compressing of said torus member operably preloading said coupling and placing said end of the pin end member and said torus member of said box end member in compression while said union box member is placed in tension,
the union box member having a lower annular end beneath its set of helical threads and adapted to cooperate with an upwardly facing annular shoulder disposed beneath said first set of helical threads on the outer surface of said pin end member, the distance between said lower annular shoulder and said upper end means of the pin member and the distance between the lower annular end of the union box member and the downwardly facing shoulder of the head portion of said union box and the distance between upwardly and downwardly facing shoulders of the torus member being cooperatively provided so that said upwardly facing annular shoulder of the pin end member engages the lower annular end of said union box member when said pin end member and said box end member are coupled with proper preloading, the engagement of said upwardly facing shoulder of said pin end member and said lower annular end of said union box providing a visual indication of proper riser coupling preload.

12. The connector of claim 11 wherein the box end member has an annular portion for overlapping a recessed portion of the upper end member.

13. The connector of claim 11 further comprising
a second set of helical continuous threads formed on said inner surface of said union box member and axially and radially spaced from said other set of helical threads formed thereon and adapted to interengage with a second set of helical continuous threads formed on the inner surface of the inner box member.

* * * * *